United States Patent
Stimson et al.

[11] 3,829,162
[45] Aug. 13, 1974

[54] WHEEL ASSEMBLIES

[75] Inventors: Ian Leonard Stimson, Rugby; Frederick Sidney Dowell; Benedict Pascal Healy, both of Coventry, all of England

[73] Assignee: Dunlop Limited, Erdington, Birmington, England

[22] Filed: July 26, 1972

[21] Appl. No.: 275,246

[30] Foreign Application Priority Data
July 27, 1971 Great Britain.................... 35228/71

[52] U.S. Cl.............. 301/6 A, 192/55, 192/70.17, 301/6 D, 301/6 E
[51] Int. Cl.............................................. B60b 19/00
[58] Field of Search ........ 301/6 R, 6 D, 6 WB, 6 A, 301/6 CS, 6 E; 188/71.5; 192/70.2, 55, 70.17

[56] References Cited
UNITED STATES PATENTS
1,978,922 10/1934 Wemp............................ 192/70.17
2,925,897 2/1960 Snyder............................. 192/70.2
3,051,528 8/1962 Rogers............................. 301/6 CS
3,061,050 10/1972 Van Horn........................ 301/6 A
3,548,984 12/1970 Root................................ 192/70.17
3,739,883 6/1973 Marin.............................. 192/70.17

FOREIGN PATENTS OR APPLICATIONS
700,256 12/1964 Canada............................. 301/6 A Primary Examiner—Robert S. Ward, Jr.
Assistant Examiner—Reinhard J. Eisenzopf

[57] ABSTRACT

A wheel assembly comprising a wheel having disc and rim portions, a drive means in the form of a number of circumferentially spaced drive dogs arranged to extend substantially parallel to the intended axis of rotation of the wheel assembly, and an intermediate circumferentially extending heat isolating member arranged to extend between the drive dogs and the wheel, of which the following is a specification.

16 Claims, 7 Drawing Figures

WHEEL ASSEMBLIES

This invention relates to wheel assemblies and particularly to aircraft wheel assemblies in which drive dogs are fastened to the inner periphery of the wheel rim to key with notches formed in the outer peripheries of associated brake rotors.

As the performance requirements for aircraft brakes progressively increase, the problem of controlling the heat transferred from the brakes to the surrounding components, such as the associated aircraft wheel, assumes greater importance.

It is an object of the present invention to provide a wheel assembly incorporating a drive dog construction which reduces the heat transferred from the associated brake to the wheel.

In certain kinds of aircraft brakes, excessive heat transferral between the brake and the wheel will cause mechanical failure because of damage produced to the rotors and such effect is particularly pronounced when brake rotors of fragile material such as carbon or beryllium are employed.

It is therefore another object of this invention to provide a wheel assembly incorporating drive dog constructions which are less likely to cause damage to the brake rotors than conventional drive dog arrangements.

According to the invention, a wheel assembly comprises a wheel having disc and rim portions, a drive means in the form of a number of circumferentially spaced drive dogs arranged to extend substantially parallel to the intended axis of rotation of the wheel assembly, and an intermediate circumferentially extending heat isolating member arranged to extend between the drive dogs and the wheel.

The intermediate heat isolating member may conveniently comprise a sheet metal drum which extends co-axially within but spaced from the wheel except at its point of attachment to or support thereon.

Several embodiments of the invention will now be described, by way of example with reference to FIGS. 1 to 7 of the accompanying drawings in which.

Figure 1:
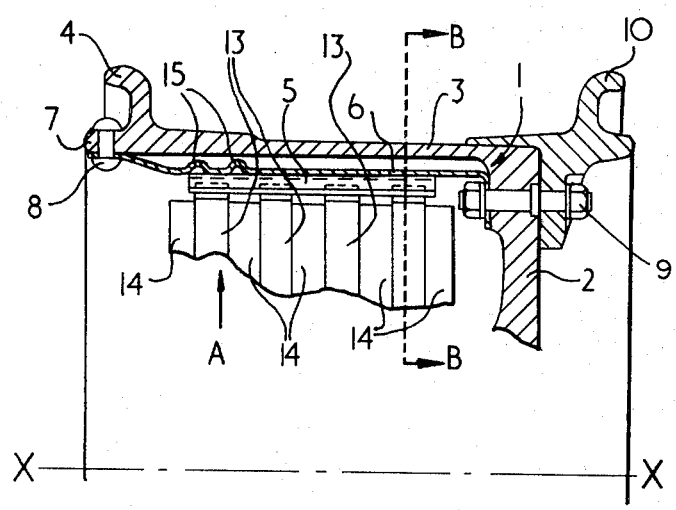
FIG. 1 is a radial section through part of a wheel assembly in accordance with the present invention.
Figure 2:
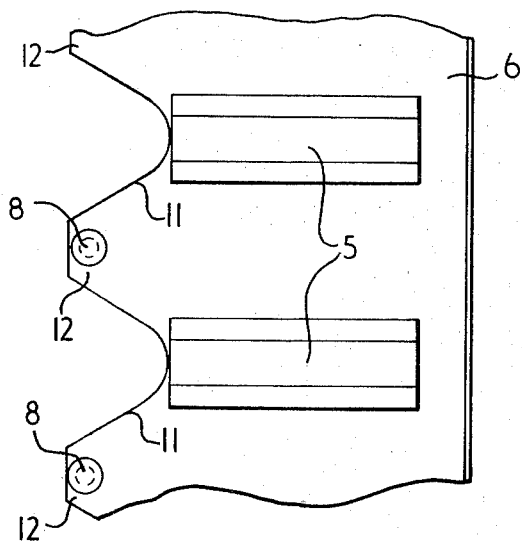
FIG. 2 is an end view in the direction of the arrow A of FIG. 1.
Figure 3:
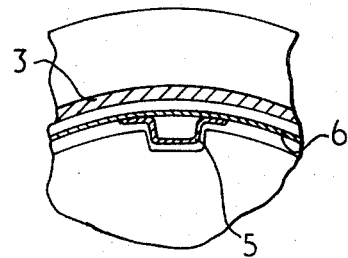
FIG. 3 is a sectional view on the line B—B of FIG. 1.

An aircraft wheel assembly, as shown in FIGS. 1 to 3, comprises an aircraft wheel 1 having a disc portion 2, a rim portion 3 provided with an integrally formed tyre bead retaining flange 4 and a detachable tyre bead retaining flange 10, and a number of circumferentially spaced drive dogs 5 secured to a heat isolating member in the form of a flexible metal drum 6.

The drum extends co-axially within the wheel, one edge being attached by rivets 8 to a portion 7 of the wheel rim which projects axially outwardly beyond adjacent integrally formed tyre bead retaining flange 4. The other edge of the drum is formed into a radially inwardly turned flange which is secured to the disc portion 2 of the wheel by a number of circumferentially spaced nut and bolt assemblies 9 which also secure detachable tyre bead retaining flange 10 in position.

A brake assembly comprising a series of interleaved rotor and stator discs 13 and 14 is mounted radially within the wheel. A series of circumferentially spaced hydraulic actuating piston and cylinder assemblies (not shown) are provided in order to bring the rotors and stators into frictional engagement.

The rotor and stator discs are of carbon based material, for example carbon-fibre reinforced, and are of annular form. The stator discs 14 are provided with notches on their inner peripheries (not shown) for engagement with a non-rotatable torque tube (not shown) and the rotor discs 13 are formed with notches at their outer peripheries for engagement with the drive dogs 5.

The drive dogs, which are arranged to extend substantially parallel to the intended axis of rotation X—X of the wheel, are formed from flanged channel section sheet metal and are rivetted or otherwise secured to the drum so as to provide hollow axially extending structures as shown in FIG. 3.

The edge of the drum which is secured to the rim extension is turned radially outwardly and may be provided with V-shaped cut-out portions 11 with intermediate tongues 12 secured at their ends to the rim. The provision of V-shaped cut-out portions 11 increases the flexibility of this edge of the drum and allows the drive dogs to deflect radially in response to shape deforming loads imposed on the wheel during landing, thereby preventing damage to the associated brake rotors and also preventing binding of the rotors on the drive dogs.

Circumferential ribs 15 may be formed in the drum adjacent the ends of the drive dogs nearest the point of attachment of the drum to the rim in order to hold the drum in a substantially circular form in this region.

Figure 4:
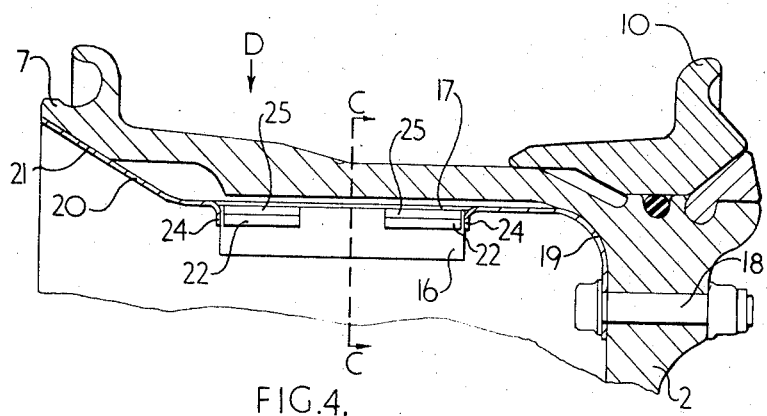
FIG. 4 is a radial section through part of a further form of wheel assembly in accordance with the present invention in which drive dogs are mounted on a sheet metal drum mounted within the wheel rim.
Figure 5:
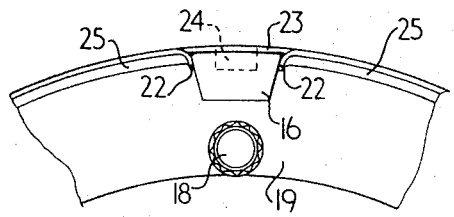
FIG. 5 is a view of the sheet metal drum and drive dogs on the line C—C of FIG. 4.
Figure 6:
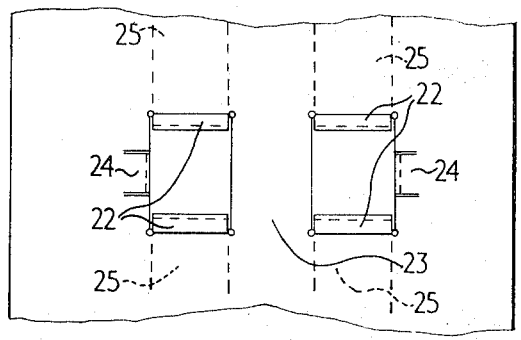
FIG. 6 is a view of the sheet metal drum, with the drive dogs removed, in the direction of arrow D of FIG. 4.

In a further wheel assembly, shown in FIGS. 4 to 6, drive dogs 16 are mounted on a sheet metal drum 17 which is secured at one edge to the disc portion 2 of the wheel by a series of nut and bolt assemblies 18 which extend through a radially inwardly turned flange 19 provided on the drum. The other edge of the drum is provided with a radially outwardly angled flange 20 which makes abutting contact with a correspondingly angled surface 21 provided on the extended portion 7 of the wheel rim.

The drive dogs 16 each have a dove-tailed radial cross-section which co-operates with at least two sets of radially inwardly extending tabs 22 spaced in pairs along the length of the drive dogs and formed from the material of the drum. The tabs of each pair are inclined inwardly towards each other, that is they extend towards each other at an angle to the corresponding radii of the drum, and are placed one on each side of the associated drive dog in order to prevent its radially inward and circumferential movement. The portion 23 of the drum between the pair of tabs is arranged to extend on the radially outer side of the drive dog thus preventing its radially outward movement and a further pair of radially inwardly extending tabs 24 are provided one at each end of the drive dog to prevent its axial movement.

If desired the wheel assembly shown in FIGS. 4 to 6 can be strengthened by welding or otherwise securing arcuate metal strips 25 between adjacent drive dogs and arranging these strips to bear on the rear free faces of the tabs 22 which locate the drive dogs against radially inward and circumferential movement.

The drive dogs used in the wheel assembly shown in FIGS. 4 to 6 can be formed from metals such as steel or beryllium or alternatively from materials such as carbon fibre reinforced carbon or ceramic material which have lower thermal conductivities.

The sheet metal drive dogs used in the wheel assembly shown in FIGS. 1 to 3 can be replaced by the drive dog arrangement shown in FIGS. 4 to 6 if required.

Figure 7:
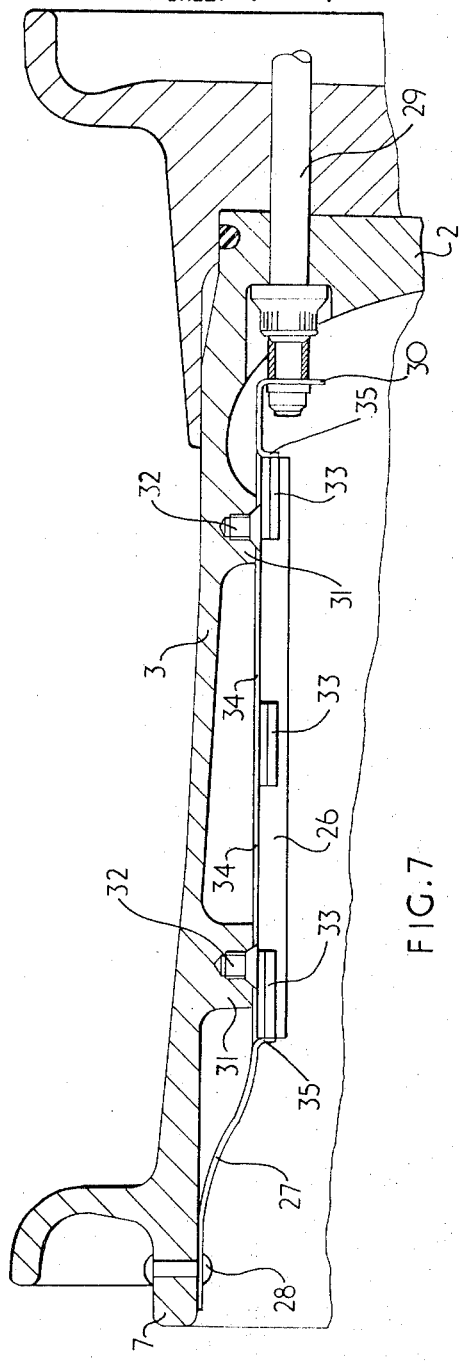
FIG. 7 is a radial section through part of a still further wheel assembly in accordance with the present invention.

In a still further wheel assembly shown in FIG. 7 the drive dogs 26, which may be formed from metal, reinforced carbon or ceramic material, are mounted on a flexible sheet metal drum 27 which extends co-axially within the wheel rim. One edge of the drum is secured to the wheel rim by rivets 28 and the other edge of the drum is secured to the disc portion of the wheel by nut and bolt assemblies 29 which extend through a radially inwardly turned flange 30 provided on the drum.

The drum is also supported intermediate its edges on the rim by two radially inwardly projecting circumferentially extending annular ridges 31 to which the drum is secured by countersunk screws 32.

The drive dogs are mounted on the drum in the manner previously described with reference to FIGS. 4 to 6 by using two or more pairs of radially inwardly projecting tabs 33, arranged on either side of each drive dog, which prevent radially inward and circumferential movement of the dogs. The portions 34 of the drum between the pairs of tabs 33 are again arranged to extend on the radially outer side of the dogs thus preventing radially outward movement of the dogs and a further pair of tabs 35 is provided one at each end of each dog to prevent axial movement of the dogs.

By providing the circumferentially extending ridges 31 to support the drum member 27 it is possible to use the sheet metal drum form of isolation member for higher brake torque applications and in wider rimmed wheels. The number and positioning of the ridges can be varied to meet the requirements of the particular wheel assembly.

In the various wheel assemblies described above the drive dogs are spaced from the wheel by being attached to an intermediate isolating member in the form of a sheet metal drum which extends adjacent the inner periphery of the associated wheel rim. By isolating the drive dogs from the wheel in this manner the amount of heat conducted from the brake assembly to the wheel is reduced. The metal drum also provides additional protection against the passage of heat to the wheel by radiation thereby further reducing the operating temperature of the wheel.

An additional advantage of the isolating member is that in addition to the function of shielding the wheel from braking heat, it also provides a flexible mounting for the drive dogs and such quality compensates at least partially for distortions of the wheel which occur during aircraft landing for example.

If desired heat insulating material can be positioned between the sheet metal drum and the wheel rim to further reduce the heat transferred from the brake to the wheel.

Although in all the wheel assemblies described above the sheet metal drums on which the drive dogs are mounted are secured at one edge to the wheel rim and the other edge to the wheel disc it will be understood by those skilled in the art that both edges of the drum can alternatively be secured to the wheel rim.

HAVING NOW DESCRIBED OUR INVENTION — WHAT WE CLAIM IS:

1. A wheel assembly comprising a wheel having disc and rim portions, a drive means in the form of a number of circumferentially spaced drive dogs arranged to extend substantially parallel to the intended axis of rotation of the wheel assembly and an intermediate circumferentially extending heat isolating member arranged to extend between the drive dogs and the wheel.

2. A wheel assembly according to claim 1 in which the drive dogs are mounted on an isolating member in the form of a flexible sheet metal drum which extends co-axially within but spaced from the wheel except at its points of attachment to or support thereon.

3. A wheel assembly according to claim 2 in which one edge of the drum is operatively associated with the disc portion of the wheel and the other edge of the drum is operatively associated with the rim portion of the wheel.

4. A wheel assembly according to claim 3 in which the edge of the drum associated with the rim portion of the wheel is arranged to extend radially outwardly into contact with the wheel at an angle relative to the intended axis of rotation of the wheel assembly and the other edge of the drum is provided with a radially inwardly extending flange which is secured to the disc portion of the wheel.

5. A wheel assembly according to claim 4 in which the radially outwardly turned edge of the drum is secured to the wheel rim.

6. A wheel assembly according to claim 2 in which both edges of the drum are secured to the rim portion of the wheel.

7. A wheel assembly according to claim 2 in which heat insulating material is provided between the drum and the wheel.

8. A wheel assembly according to claim 2 in which the drum is supported intermediate its edges on a number of radially inwardly projecting circumferentially extending annular ridges formed on the inner periphery of the wheel rim.

9. A wheel assembly according to claim 2 in which each drive dog has a dove-tail shaped radial cross-section and is mounted on the drum by means of at least two sets of radially inwardly extending tabs spaced along the length of the dog, the tabs of each pair being arranged to extend one on each side of the drive dog and inclined inwardly towards each other in order to co-operate with the drive dog thereby preventing its radially inward and circumferential movement, the portion of the drum between the sets of tabs being arranged to extend on the radially outer side of the drive dog thereby preventing radially outward movement of the dog.

10. A wheel assembly according to claim 9 in which each drive dog is located against axial movement by a further set of radially inwardly extending tabs arranged to engage the ends of the drive dog.

11. A wheel assembly according to claim 9 in which arcuate metal strips are secured to the drum between adjacent drive dogs, these strips being arranged to bear against the rear free faces of the tabs which locate the drive dogs against radially inward and circumferential movement thereby strengthening the tabs.

12. A wheel assembly according to claim 9 in which the drive dogs are formed from reinforced carbon material.

13. A wheel assembly according to claim 9 in which the drive dogs are formed from ceramic material.

14. A wheel assembly according to claim 2 in which the drive dogs are formed from flanged channel section sheet metal.

15. A wheel assembly in accordance with claim 1 wherein said heat isolating member is in the form of a sheet metal drum, said drum having an edge disposed remotely from the disc portion of said wheel and is provided with V-shaped cut out portions to effect flexibility of the drum.

16. A wheel assembly according to claim 15 including circumferentially extending ribs formed integrally within the drum adjacent to the ends of the drive dogs remote from the disc portion of said wheel.

* * * * *